(12) United States Patent
Murthy-Bellur et al.

(10) Patent No.: US 12,508,930 B2
(45) Date of Patent: Dec. 30, 2025

(54) SYSTEM FOR BIDIRECTIONAL ELECTRICAL ENERGY TRANSFER

(71) Applicant: Cummins Inc., Columbus, IN (US)

(72) Inventors: Dakshina S. Murthy-Bellur, Minneapolis, MN (US); Bradford K. Palmer, Ham Lake, MN (US)

(73) Assignee: Cummins Inc., Columbus, IN (US)

( * ) Notice: Subject to any disclaimer, the term of this patent is extended or adjusted under 35 U.S.C. 154(b) by 158 days.

(21) Appl. No.: 17/761,822

(22) PCT Filed: Oct. 30, 2020

(86) PCT No.: PCT/US2020/058334
§ 371 (c)(1),
(2) Date: Mar. 18, 2022

(87) PCT Pub. No.: WO2021/087343
PCT Pub. Date: May 6, 2021

(65) Prior Publication Data
US 2022/0332206 A1   Oct. 20, 2022

Related U.S. Application Data

(60) Provisional application No. 62/928,449, filed on Oct. 31, 2019.

(51) Int. Cl.
*B60L 1/00*    (2006.01)
*B60L 53/20*   (2019.01)
(Continued)

(52) U.S. Cl.
CPC .............. *B60L 53/50* (2019.02); *B60L 1/003* (2013.01); *B60L 53/20* (2019.02); *B60L 58/12* (2019.02);
(Continued)

(58) Field of Classification Search
CPC .......... B60L 53/50; B60L 1/003; B60L 53/20; B60L 58/12; B60L 58/18; B60L 2210/10;
(Continued)

(56) References Cited

U.S. PATENT DOCUMENTS 8,020,650 B2   9/2011   Van Maanen et al.
8,504,231 B2   8/2013   Kim
(Continued)

FOREIGN PATENT DOCUMENTS

WO   2017173420 A1   10/2017

OTHER PUBLICATIONS

International Search Report and Written Opinion for International patent application No. PCT/US2020/058334, filed Oct. 30, 2020, mailed Feb. 3, 2021.
(Continued)

*Primary Examiner* — Rexford N Barnie
*Assistant Examiner* — Xuan Ly
(74) *Attorney, Agent, or Firm* — Faegre Drinker Biddle & Reath LLP (57) ABSTRACT

A system is disclosed which includes a primary energy storage device with a first voltage level, a secondary energy storage device with a second voltage level that is lower than the first voltage level, and a bidirectional direct current (DC-DC) converter coupled to the primary and secondary energy storage devices. The bidirectional DC-DC converter is operable to transfer energy from the primary energy storage device to the secondary energy storage device and from the secondary energy storage device to the primary energy storage device.

13 Claims, 5 Drawing Sheets

(51) Int. Cl.
*B60L 53/50* (2019.01)
*B60L 58/12* (2019.01)
*B60L 58/18* (2019.01)
*H02J 7/34* (2006.01)

(52) U.S. Cl.
CPC .............. *B60L 58/18* (2019.02); *H02J 7/342* (2020.01); *B60L 2210/10* (2013.01); *H02J 2207/20* (2020.01)

(58) Field of Classification Search
CPC .. B60L 1/00; B60L 1/006; B60L 55/00; B60L 58/20; H02J 7/342; H02J 2207/20; H02J 7/34; Y02E 60/00; Y02T 10/70; Y04S 10/126
USPC ........................................................ 307/10.1
See application file for complete search history.

(56) References Cited

U.S. PATENT DOCUMENTS

| | | | |
|---|---|---|---|
| 8,508,066 B2 | 8/2013 | Lee et al. | |
| 8,606,447 B2 | 12/2013 | Namuduri et al. | |
| 8,660,729 B2 | 2/2014 | Miyazaki | |
| 8,884,460 B2 | 11/2014 | Wagner | |
| 8,994,208 B2 | 3/2015 | Huang | |
| 2006/0214637 A1 | 9/2006 | Gonzales | |
| 2014/0009106 A1* | 1/2014 | Andrea | H02H 9/002 320/126 |
| 2014/0117753 A1* | 5/2014 | Pradier | B60R 16/02 307/9.1 |
| 2014/0244082 A1* | 8/2014 | Caron | B60L 50/61 290/40 R |
| 2018/0287494 A1* | 10/2018 | Yano | H02M 3/1582 |
| 2019/0143822 A1 | 5/2019 | Malek | |
| 2019/0363406 A1* | 11/2019 | Yamada | H02J 7/00712 |

OTHER PUBLICATIONS

Supplementary European Search Report and Written Opinion for European patent application No. 20883507, mailed Nov. 14, 2023.
International Preliminary Report on Patentability received for PCT Patent Application No. PCT/US2020/058334, mailed on May 12, 2022, 7 pages.

* cited by examiner

SYSTEM FOR BIDIRECTIONAL ELECTRICAL ENERGY TRANSFER

CROSS-REFERENCE TO RELATED APPLICATION

This application claims priority to International Patent Application No. PCT/US2020/058334, filed Oct. 30, 2020, which claims priority to U.S. Provisional Application No. 62/928,449, filed on Oct. 31, 2019, the complete disclosures of which are incorporated herein by reference in their entirety.

FIELD OF THE DISCLOSURE

The present disclosure relates generally to electric vehicles, especially to transferring electrical energy among components of an electric vehicle.

BACKGROUND OF THE DISCLOSURE

Recently, there has been an increased demand for electric vehicles which use electrical energy storage devices such as batteries to power the motor that drives the vehicles. Because different electrical components of the electric vehicles require different voltage levels, converters are used to convert from one voltage level to another. Specifically, converters perform a number of different functions in vehicle applications and power conversion, such as traction inverters for multi-phase (e.g., three-phase, four-phase, etc.) electrical machines including, for example, permanent magnet motors, induction motors and switched reluctance motors, battery chargers, air compressors, power steering systems, high efficiency alternators, AC (alternating current) power output to an electrical load or power grid from an inverter, heat, ventilation and air conditioning systems (HVAC), electrical fans, etc.

Figure 1:
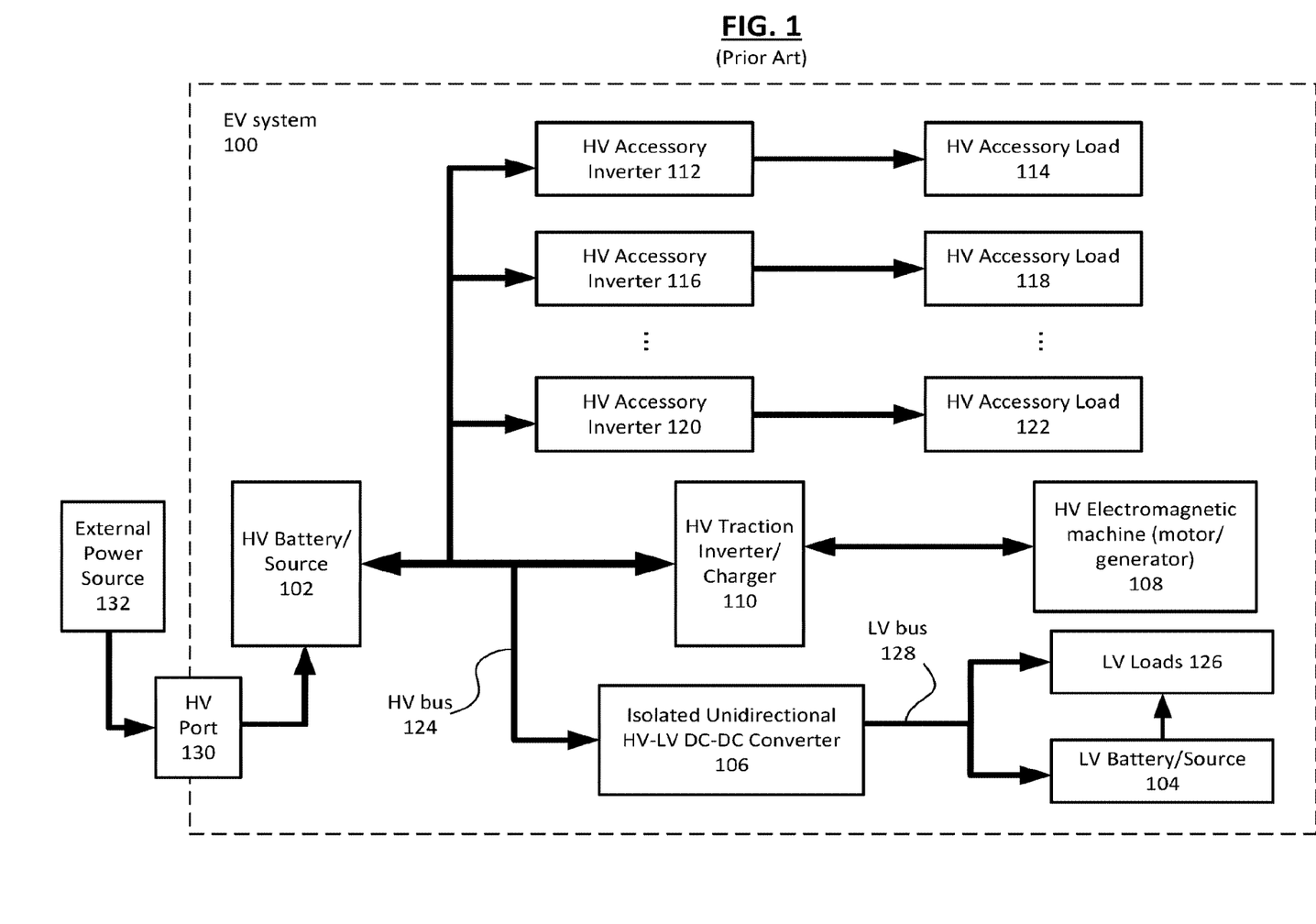
FIG. 1 is a block diagram of a prior-art example of an electric vehicle system as known in the art.

Shown in FIG. 1 is an example of an electric vehicle (EV) system 100 as presently known in the art. The EV system 100 includes a high-voltage energy source, such as a high-voltage battery 102, a low voltage energy source, such as a low voltage battery 104, and an isolated unidirectional high-voltage to low-voltage direct current converter 106 connecting the two batteries 102 and 104. The EV system 100 also includes a high-voltage electromagnetic machine such as a motor/generator 108 and a high-voltage traction inverter/charger 110 which connects the high-voltage battery 102 with the motor/generator 108. The high-voltage traction inverter 110 is used to drive the high-voltage motor 108, and the high-voltage charger 110 is used to transmit the energy generated by the high-power generator 108 to the high-voltage battery 102. Furthermore, the EV system 100 includes a plurality of high-voltage accessory inverters 112, 116, 120 and high-voltage accessory loads 114, 118, 122. A high-voltage bus 124 connects the aforementioned high-voltage components together, while a low-voltage bus 128 connects the aforementioned low-voltage components together. The low-voltage components include the low-voltage battery 104 and low-voltage loads 126.

In the EV system 100, power is always provided from a high-voltage source to a low-voltage sink. As such, power is provided from either the high-voltage battery 102 and/or the high-voltage generator 108 to the low-voltage battery 104 and the low-voltage loads 126. When there is shortage of power in the low-voltage battery 104, the high-voltage battery 102 provides the power to charge the low-voltage battery 104. On the other hand, when the high-voltage battery 102 is short on power, the power to charge the high-voltage battery 102 is provided by either the high-voltage generator 108 or an external power source 132, such as a power grid, connected to the EV system 100 via a high-voltage port 130 which is capable of transmitting power at a high voltage. Although not shown, in some examples, the high-voltage port 130 is coupled with an AC-to-DC converter if the external power source 132 is an AC source.

In view of the above examples, there is a need for an EV system that allows for more flexible energy transfer among the different components, specifically in utilizing the low-voltage energy source to power more components than is heretofore permitted.

SUMMARY OF THE DISCLOSURE

A system is disclosed which includes a primary energy storage device with a first voltage level; a secondary energy storage device with a second voltage level that is lower than the first voltage level; and a bidirectional direct current (DC-DC) converter coupled to the primary and secondary energy storage devices, the bidirectional DC-DC converter operable to transfer energy from the primary energy storage device to the secondary energy storage device and from the secondary energy storage device to the primary energy storage device.

In one example, the system also includes a motor/generator operatively coupled to the primary energy storage. In one example, the secondary energy storage device is configured to provide energy to at least one of: the primary energy storage device and the motor/generator. In one example, the system also includes at least one high voltage accessory operatively coupled to the primary energy storage device. In one example, the secondary energy storage device is configured to provide energy to the at last one high voltage accessory when the primary energy storage device is offline. In one example, the secondary energy storage device is configured to provide energy to the primary energy storage device during a power-up procedure to pre-charge the primary energy storage. In one example, the at least one high voltage accessory includes one or more of: fans, air-brake pumps, power steering, and a traction-drive inverter. In one example, the system further includes a low voltage power port operatively coupled to the bidirectional DC-DC converter. In one example, the low voltage power port is configured to provide energy to at least one of: the primary energy storage device, the secondary energy storage device, and the motor/generator. In one example, the low voltage power port is connected to an external power unit to supply energy thereto and receive energy therefrom. In one example, the system further includes at least one low voltage load device operatively coupled to the secondary energy storage device, wherein the secondary energy storage device is configured to provide energy to the at least one low voltage load. In one example, the system is implemented on an electric vehicle. In one example, the at least one low voltage load device includes on-vehicle electric power accessories.

Another system is disclosed herein which includes a primary energy storage device with a first voltage level; a secondary energy storage device with a second voltage level that is lower than the first voltage level; a primary unidirectional direct current (DC-DC) converter coupled to the primary and secondary energy storage devices, the primary unidirectional DC-DC converter operable to transfer energy from the primary energy storage device to the secondary energy storage device; and a secondary unidirectional direct current (DC-DC) converter coupled to the primary and secondary energy storage devices, the secondary unidirectional DC-DC converter operable to transfer energy from the secondary energy storage device to the primary energy storage device. In one example, the system also includes a motor/generator operatively coupled to the primary energy storage. In one example, the secondary energy storage device is configured to provide energy using the secondary unidirectional DC-DC converter to at least one of: the primary energy storage device and the motor/generator. In one example, the system is implemented on an electric vehicle.

A method of supplying electrical energy in an electric vehicle system is also disclosed herein. The method includes supplying the electrical power from a primary energy storage device with a first voltage level and a first state of charge to a secondary energy storage device with a second voltage level lower than the first voltage level and a second state of charge by transferring the electrical energy through a bidirectional direct current (DC-DC) converter when the second state of charge is less than the first state of charge; and supplying the electrical power from the secondary energy storage device to the primary energy storage device by transferring the electrical energy through the bidirectional direct current (DC-DC) converter when the first state of charge is less than the second state of charge. In one example, the method also includes supplying the electrical power from the secondary energy storage device to at least one accessory load coupled to the primary energy storage device when the primary energy storage device is offline.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 2:
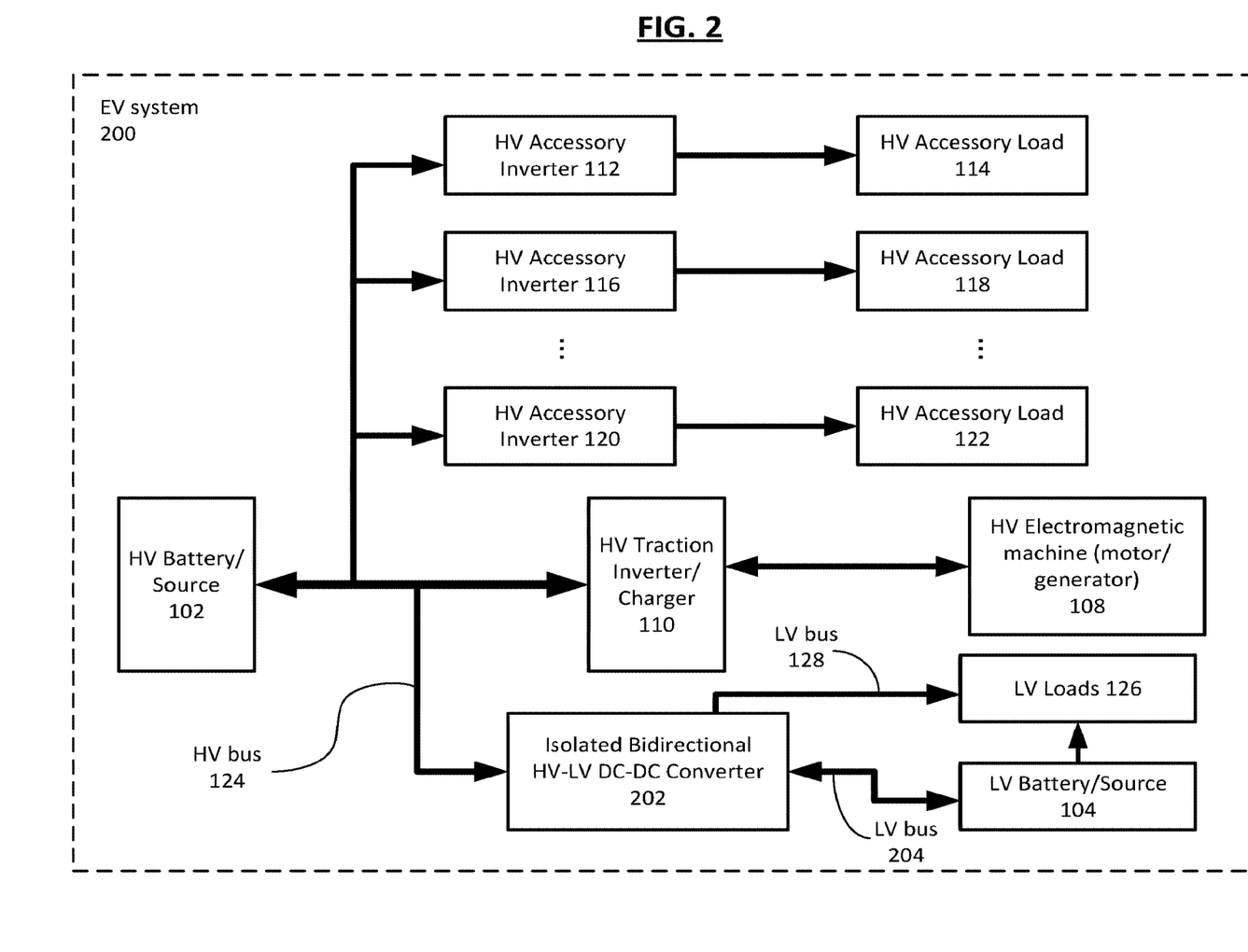
FIG. 2 is a block diagram of an example of an electric vehicle system according to one embodiment.

As shown in FIG. 2, an electric vehicle (EV) system 200 according to an embodiment includes an isolated bidirectional direct current (DC) converter 202 that converts power from high-voltage to low-voltage and from low-voltage to high-voltage. There may be any number of high-voltage accessory loads in the EV system 200. The high-voltage energy storage device 102 (e.g. battery) may be configured to propel the high-voltage motor 108 of the EV system 200, and the high-voltage battery 102 may also power the high-voltage accessory loads 114, 118, and 122. Examples of such high-voltage accessory loads include high-voltage air conditioning (HVAC) systems for controlling temperature of the high-voltage battery 102, as well as for controlling the vehicle cabin temperature. Another example of such loads includes an electric power steering system which uses hydraulics (in a hydraulic power steering system), electric actuators (in an electric power-assisted steering or motor-driven power steering), or a combination thereof (in an electro-hydraulic power steering system or hybrid power steering system) to help the driver steer the vehicle by augmenting the steering effort of the steering wheel. In another example, the vehicle may be a compressed-air vehicle or a hybrid-electric compressed air vehicle which uses the compressed air provided by a high-pressure pump to power the motor 108, where the high-pressure compressed air pump is powered by the high-voltage battery 102. Another example of the high-voltage accessory load 114, 118, 122 includes air brake compressors or pumps which compress air into air reservoirs which is then used in the air-brake system to push on the brake pad with a high pressure of about 120 psi. The high-voltage traction inverter 110 is also a high-voltage load. The energy storage devices 102 and 104 may be lithium-ion batteries, lead acid batteries, or any other suitable types of energy storage devices known in the art. Each of the energy storage devices may be controlled by one or more energy storage device controllers or energy storage device management systems (not shown). Such controllers and management systems may include circuitry capable of regulating, managing, and/or controlling the available voltage differences and/or current. The controllers and management systems may also determine when and how to transfer energy to and from one or more of the energy storage devices.

In comparison, the low-voltage loads 126 are vehicle components that require lower voltage levels than the high-voltage accessory loads 114, 118, 122. In some examples, the low-voltage battery 104 is configured to power the windows, the locks, the doors, the entertainment systems, infotainment systems, wireless modems, routers, and other suitable components of the EV system 200. In an EV system, having two or more separate sources of energy (e.g. batteries 102 and 104) is advantageous because when one of the sources (a first energy source) is low on energy, the other source (a second energy source) is capable of charging the source with the lower energy (in this example, the first energy source). Also, the second energy source is capable of powering the components that would otherwise be powered by the first energy source.

It should be noted that the above scenario can be applied to situations where the low-voltage battery 104 is low on energy and where the high-voltage battery 102 is low on energy. As such, because of the DC-DC converter 202 is bidirectional, the energy transfer can be achieved from the high-voltage battery 102 to the low-voltage battery 104, from the low-voltage battery 104 to the high-voltage battery 102, from the high-voltage battery 102 to the low-voltage loads 126, and from the low-voltage battery 104 to any of the high-voltage accessory loads 114, 118, 122 as well as to the high-voltage motor/generator 108. As such, unlike in the prior-art example shown in FIG. 1, the EV system 200 is capable of using the low-voltage battery 104 to charge the high-voltage battery 102 and to power any one or more of the high-voltage accessory loads 114, 118, 122 and the high-voltage motor/generator 108 when the high-voltage battery 102 is either too low on energy to power any of these components or is taken offline due to maintenance or other reasons, by supplying the energy through a low-voltage bus 204 to the bidirectional DC-DC converter 202. The high-voltage bus 124 and the low-voltage bus 128 and 204, which are used for the various components and circuits to be in communication with one another, use protocols or interfaces such as a CAN bus, SPI, or other suitable interfaces, for example.

Pre-charging limits the inrush current when a battery is initially connected to a load with capacitive input, such that doing so would increase the lifespan of electronic components and increase reliability of the high voltage system. A pre-charge circuitry of a battery or battery packs may include a pre-charge resistor to limit the inrush current and a contactor or high-power relay across the pre-charge resistor to bypass the resistor during normal operation. In some examples, the bidirectional DC-DC converter 202 may be used to pre-charge the high-voltage bus 124 (e.g. the high-voltage battery 102) from the low-voltage battery 104 during a power-up procedure. Using the low-voltage battery 104 to pre-charge the high-voltage battery 102 may eliminate the need for the pre-charge circuitry to be implemented with the battery packs. Alternatively, using the low-voltage battery 104 to pre-charge the high-voltage bus 124 may also be beneficial in accelerating the pre-charge process when the pre-charge circuitry (not shown) is retained in the battery or battery packs.

Figure 3:
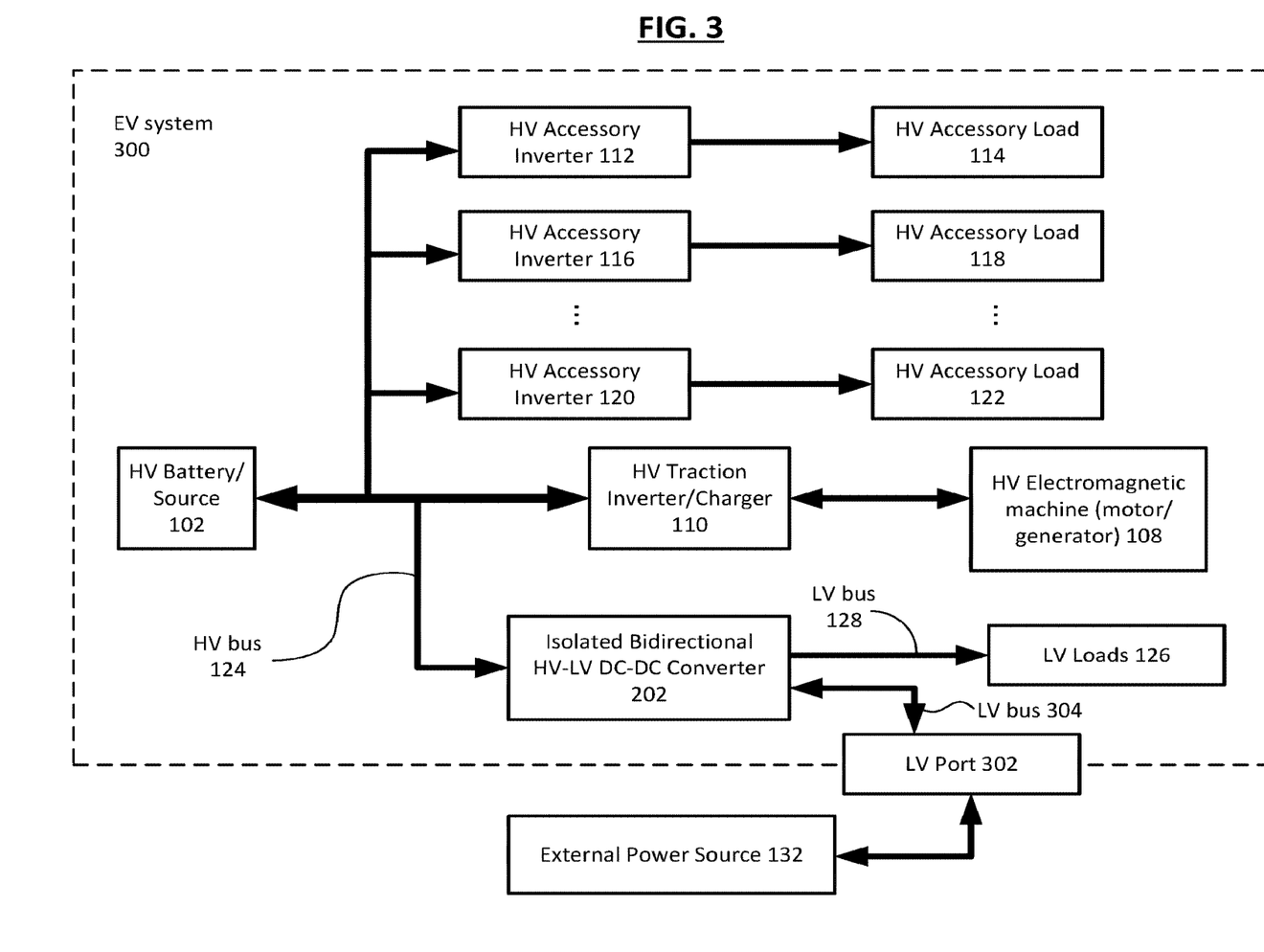
FIG. 3 is a block diagram of an example of an electric vehicle system according to one embodiment.

FIG. 3 shows an EV system 300 according to an embodiment, which differs from the EV system 200 in FIG. 2 in that the EV system 300 includes the external power source 132 which is coupled to a low-voltage port 302 which supplies power from the external power source 132 through a low-voltage bus 304, the bidirectional DC-DC converter 202, the high-voltage bus 124, and then to any one or more of: the high-voltage battery 102, the high-voltage motor/generator 108, and the high-voltage accessory loads 114, 118, 122. In this example, there is no low-voltage battery 104 that is providing power to the low-voltage loads 126, and the external power source 132 also provides power to the low-voltage loads 126 through the low-voltage bus 128. The external power source 132 may be a power grid, another battery such as a starting battery, or low-voltage battery chargers. In some examples, the external power source 132 provides DC power while in other examples, the external power source 132 provides AC power, in which case an AC-to-DC converter may be coupled to the low-voltage port 302 or the low-voltage bus 304.

Figure 4:
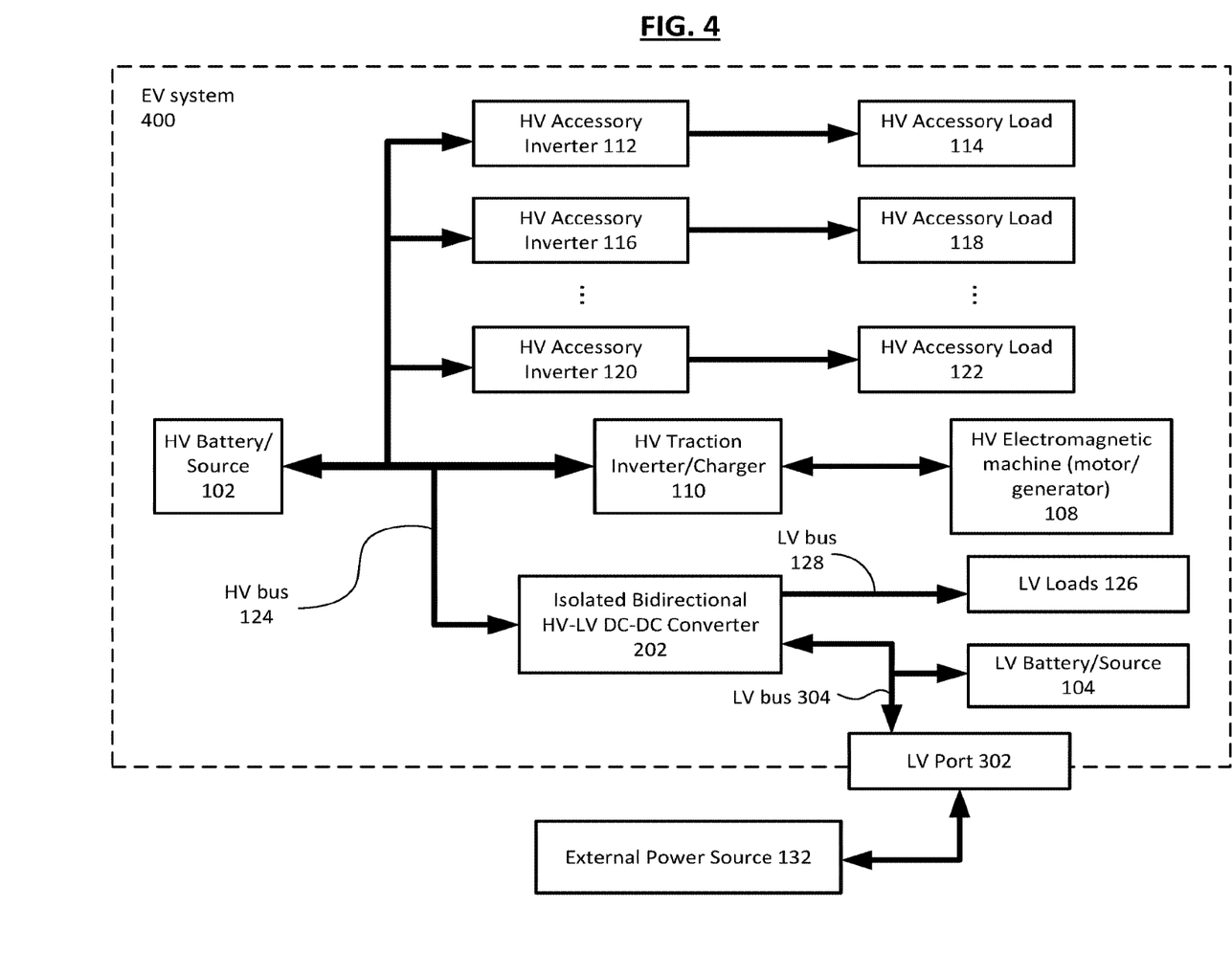
FIG. 4 is a block diagram of an example of an electric vehicle system according to one embodiment.

FIG. 4 shows an EV system 400 according to an embodiment, which differs from the EV system 300 in FIG. 3 in that the EV system 400 includes the low-voltage battery 104 which is connected to the low-voltage port 302 via the low-voltage bus 304. In this example, the external power source 132 can provide power to the low-voltage battery 104 as well, in addition to the other components previously mentioned with regard to the EV system 300. It should be noted that in both the EV systems 300 and 400, the low-voltage bus 304 and the low-voltage port 302 work bidirectionally such that the high-voltage battery 102, the high-voltage motor/generator 108, and/or the low-voltage battery 104 are capable of supplying power to the external power source 132. For example, if the EV systems 300 and 400 are used as a backup power supply, and power from the external power source 132 is halted, the EV systems 300 and 400 may be used as an energy source to power the external power source 132, if necessary.

Figure 5:
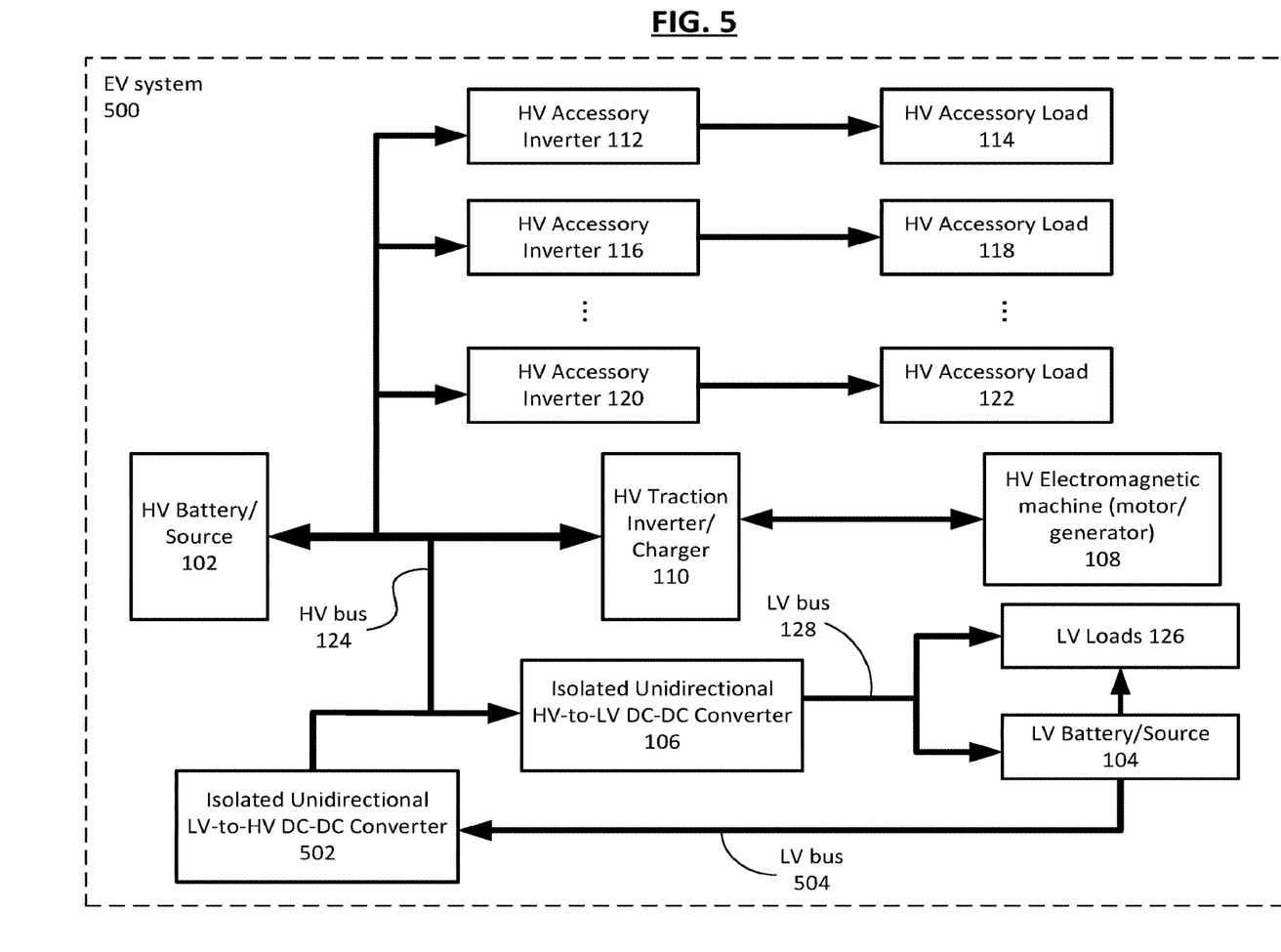
FIG. 5 is a block diagram of an example of an electric vehicle system according to one embodiment.

FIG. 5 shows an EV system 500 according to an embodiment, which differs from the EV systems 200, 300, and 400 as previously mentioned in that the EV system 500 had no bidirectional DC-DC converter but rather includes two unidirectional DC-DC converters 106 and 502. The first unidirectional DC-DC converter 106 converts from a high-voltage level to a low-voltage level between the high-voltage bus 124 and the low-voltage bus 128, whereas the second unidirectional DV-DV converter 502 converts from the low-voltage level to the high-voltage level between the two buses 124 and 128. In some examples, power can be supplied from the high-voltage battery 102 and/or the high-voltage generator 108, in which case the energy is transferred through the first unidirectional DC-DC converter 106, to the low-voltage loads 126 or the low-voltage battery 104. Power can also be supplied from the low-voltage battery 104 to any of the high-voltage components as mentioned above, by transferring energy through a low-voltage bus 504, the second unidirectional DC-DC converter 502, and then to the high-voltage bus 124.

In the aforesaid embodiments, the high-voltage battery 102 can be a single battery or a set of batteries wired together to form a battery with greater voltage. In some examples, there may be twelve batteries, with each battery having a 12 volt output, that are wired in series to create a 144-volt battery which provide 144 volts DC. In comparison, the low-voltage battery 104 can be a battery that is less than the voltage provided by the high-voltage battery 102. For example, the low-voltage battery 104 may be a single 12-volt battery or a pair of 12-volt batteries wired in a series to create a 24-volt battery, or any battery with a lower voltage level than the high-voltage battery 102. It will be apparent to a person having ordinary skill in the art that the voltage levels mentioned herein (e.g., 12-volt, 24-volt, 144-volt, etc.) are, in the context of automotive electrical systems, merely approximate values. The actual voltage measurements in an EV system may fluctuate from as low as roughly 50% to as high as roughly 150% of the "approximate value" depending on engine conditions and power usage by various vehicle systems. As such, it will be clear that the systems described herein may be utilized in the voltage range of from 50% to 150% of the approximate value.

In some examples, each of the high-voltage battery 102 and the low-voltage battery 104 has a power capacity between about 1 to 300 kilowatt hours (kWh). In some examples, the high-voltage battery 102 may have a capacity of between about 50 to 100 kWh, 100 to 200 kWh, 200 to 300 kWh or any combination thereof, and the low-voltage battery 104 may have a capacity of between about 1 to 10 kWh, 10 to 20 kWh, 20 to 30 kWh, 30 to 40 kWh, 40 to 50 kWh, or any combination thereof. Any other suitable capacity may be utilized for these batteries. When energy is transferred between components, a current is drawn from the energy source to the load. In some examples, the bidirectional DC-DC converter 202 permits a maximum low-voltage current of between about 250 to 350 amperes (A), 350 A to 450 A, 450 A to 550 A, or any combination thereof.

Bidirectionality in a DC-DC converter can provide advantages including, but not limited to, more flexibility in operating the EV system. For example, in a traditional unidirectional converter, the power can be supplied only from a high-voltage component to a low-voltage component so that the voltage is "stepped down" from a higher level to a lower level, and not vice versa. In comparison, a bidirectional converter that supplies power from the low-voltage component to the high-voltage component provides an optional method for the high-voltage component to obtain power, for example when the high-voltage component has a state of charge (SOC) that is less than the SOC of the low-voltage component. Also, allowing the low-voltage component, e.g. the low-voltage battery or the low-voltage external power source, to supply power to the high-voltage loads allows the EV system to operate even when the high-voltage energy source, e.g. the high-voltage battery, is taken offline. In one example, the EV system may be undergoing services and diagnostics in which the high-voltage battery is taken out and the system is powered using an external power source which may be a low-voltage power supply for safety reasons while system diagnostics are being performed. Alternatively, if the high-voltage battery malfunctions or becomes damaged or otherwise faulted, the EV system may be operated using the low-voltage battery as the sole power supply such that the electric vehicle can still be driven for a certain distance, which may be enough for the user to drive the vehicle to a nearby repair shop to have the faulted high-voltage battery replaced. Furthermore, a bidirectional DC-DC converter takes up less space than a pair of unidirectional DC-DC converter, as shown in FIG. 5, so a bidirectional DC-DC converter would also have a higher energy density than a pair of unidirectional DC-DC converters. Additionally, it is to be understood that the aforementioned embodiments and examples do not pertain to only EV systems, and the converters as described herein can be used for other suitable electronic devices.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A system comprising:
   a primary battery with a first voltage level;
   at least one high voltage load device operating at the first voltage level;
   a secondary battery with a second voltage level that is lower than the first voltage level;
   at least one low voltage load device operating at the second voltage level;
   a power port operatively coupled to an external power unit; and
   a bidirectional direct current (DC-DC) converter coupled to the primary and secondary batteries, the high voltage and low voltage load devices, and the power port, the bidirectional DC-DC converter operable to:
   (a) transfer energy via the power port from the external power unit to one or more of the primary battery and the high voltage load device,
   (b) transfer energy via the power port from the primary battery the external power unit,
   (c) transfer energy from the primary battery to one or more of the secondary battery and the at least one low voltage load device, and
   (d) transfer energy from the secondary battery to one or more of the primary battery and the at least one high voltage load device.

2. The system of claim 1, further comprising a motor/generator operatively coupled to the primary battery.

3. The system of claim 2, wherein the secondary battery is configured to provide energy to at least one of: the primary battery or the motor/generator.

4. The system of claim 1, further comprising at least one high voltage accessory operatively coupled to the primary battery.

5. The system of claim 4, wherein the secondary battery is configured to provide energy to the at last one high voltage accessory when the primary battery is offline.

6. The system of claim 4, wherein the secondary battery is configured to provide energy to the primary battery during a power-up procedure to pre-charge the primary battery.

7. The system of claim 4, wherein the at least one high voltage accessory includes one or more of: fans, air-brake pumps, power steering, and a traction-drive inverter.

8. The system of claim 1, wherein the power port is operable to transfer energy from the external power unit to the secondary battery.

9. The system of claim 1, wherein the at least one low voltage load device is operatively coupled to the secondary battery, wherein the secondary battery is configured to provide energy to the at least one low voltage load device.

10. The system of claim 9, wherein the system is implemented on an electric vehicle.

11. The system of claim 10, wherein the at least one low voltage load device includes on-vehicle electric power accessories.

12. A method of providing energy to a plurality of accessory load devices in an electric vehicle system, the method comprising:
 providing energy to at least one low voltage load device of the plurality of accessory load devices by:
  supplying the electrical power from a primary battery with a first voltage level to the at least one low voltage load device operating at a second voltage level lower than the first voltage level through a bidirectional direct current (DC-DC) converter operatively coupled with the at least one low voltage load device, and
  supplying the electrical power from an external power unit operating at the second voltage level via a power port; and
 providing energy to at least one high voltage load device of the plurality of accessory load devices by:
  supplying the electrical power from a secondary battery with the second voltage level to at least one high voltage load device operating at the first voltage level through the bidirectional direct current (DC-DC) converter operatively coupled with the at least one high voltage load device, and
  supplying the electrical power from the external power unit via the power port and through the bidirectional direct current (DC-DC) converter.

13. The method of claim 12, further comprising:
 supplying the electrical power from the secondary battery to the at least one high voltage load device coupled to the primary battery when the primary battery is offline.

* * * * *